United States Patent [19]
Bruner

[11] 3,987,407
[45] Oct. 19, 1976

[54] TIRE PRESSURE ALARM SYSTEM

[76] Inventor: Everett E. Bruner, 858 S. McDowell Blvd., Petaluma, Calif. 94952

[22] Filed: July 11, 1974

[21] Appl. No.: 487,725

[52] U.S. Cl. .............................. 340/58; 200/61.25; 73/146.5
[51] Int. Cl.² ........................................ B60C 23/04
[58] Field of Search ........ 340/58; 200/61.22, 61.25; 73/146.3, 146.4, 146.5

[56] References Cited
UNITED STATES PATENTS

| | | | |
|---|---|---|---|
| 1,882,661 | 10/1932 | Guthrie .............................. | 200/61.25 |
| 2,063,871 | 12/1936 | French .............................. | 200/61.25 |
| 2,334,443 | 11/1943 | Schubert .......................... | 200/61.25 |
| 2,736,004 | 2/1956 | Greene ............................... | 340/58 |
| 2,790,155 | 4/1957 | DeLucia et al. ..................... | 340/58 |
| 2,958,746 | 11/1960 | Hawkins ............................ | 340/58 |
| 3,715,719 | 2/1973 | Sugiyama .......................... | 340/58 |
| 3,760,350 | 9/1973 | Johnson ............................. | 340/58 |

*Primary Examiner*—John W. Caldwell
*Assistant Examiner*—Joseph E. Nowicki
*Attorney, Agent, or Firm*—Melvin R. Stidham

[57] ABSTRACT

A tire pressure alarm system which is mounted directly onto an existing lug bolt of a vehicle wheel after the bolt has been drilled axially to slidably accommodate a sensing rod. The sensing rod is restrained by a pressure responsive member, preferably in the form of a toroidal tube in direct fluid communication with the interior of a tire carried on the wheel. If tire pressure is lost, a spring overcomes the pressure responsive member to move the sensing rod to a position wherein it activates a signal circuit.

4 Claims, 3 Drawing Figures

U.S. Patent   Oct. 19, 1976   3,987,407
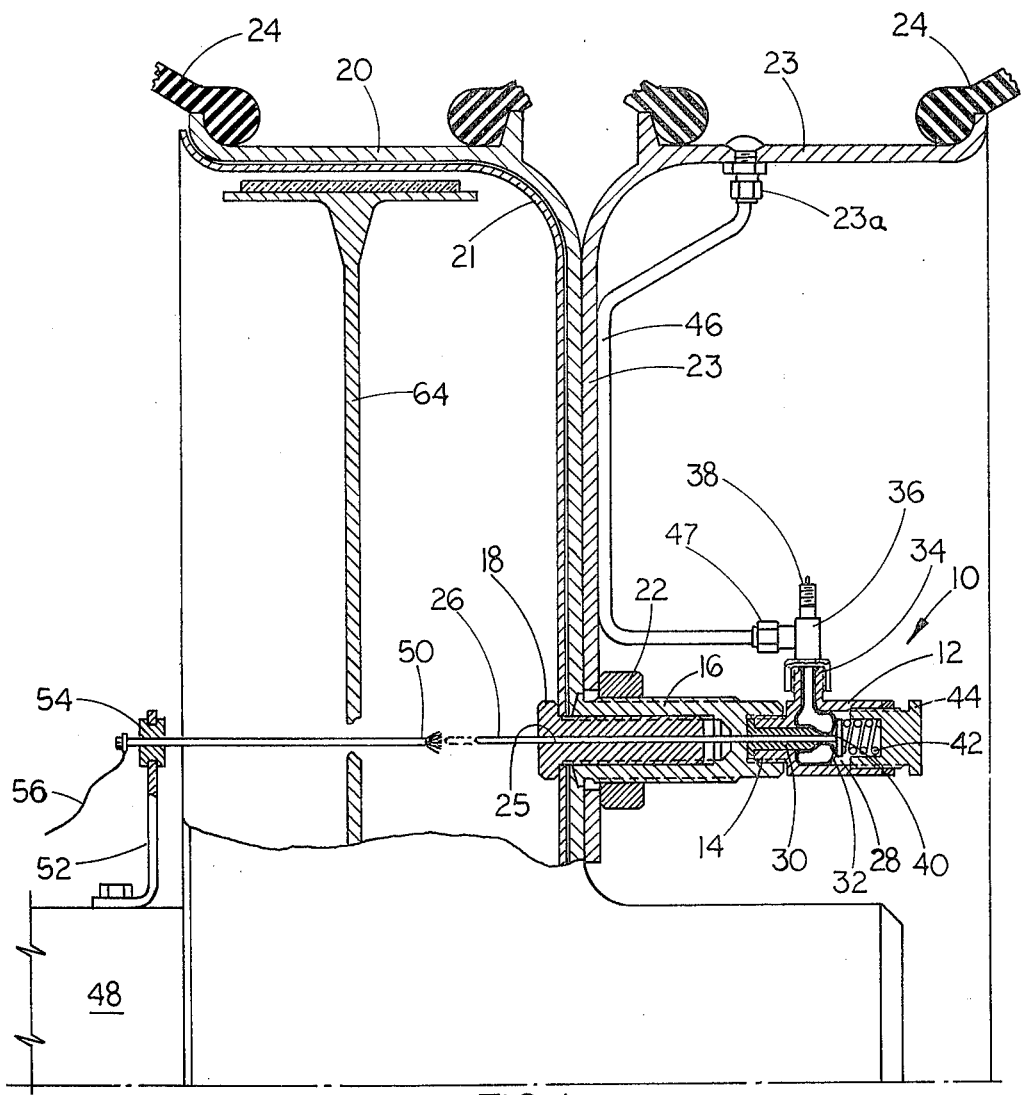
FIG-1-
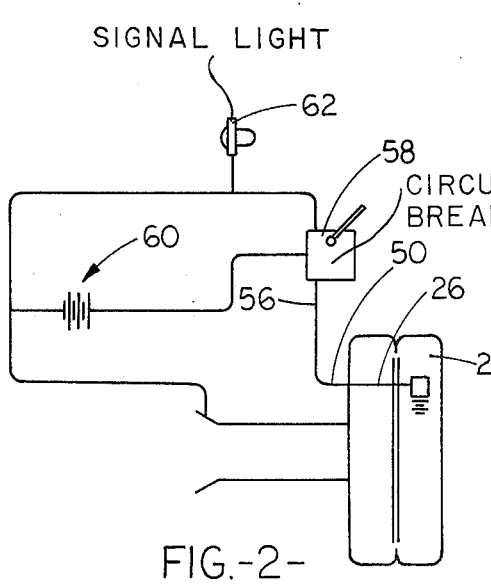
FIG.-2-
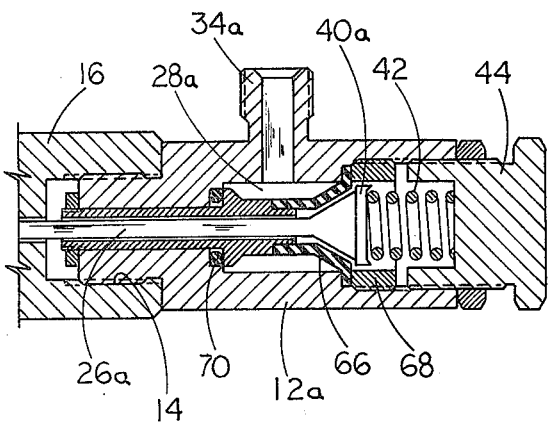
FIG.-3-

3,987,407

TIRE PRESSURE ALARM SYSTEM

BACKGROUND OF THE INVENTION

Tire pressure alarm systems previously developed are of a rather complex nature and usually require special mountings, pressure chambers and the like which could be relatively expensive to manufacture and install and greatly impede the mounting and dismounting of wheels when a tire change is necessitated.

OBJECTS OF THE INVENTION

It is an object of this invention to provide a tire pressure alarm system which can be made available at a relatively low cost.

It is a further object of this invention to provide a tire pressure alarm system which may easily be installed on conventional automotive wheels.

It is a further object of this invention to provide a tire pressure alarm system which may be mounted directly on an existing wheel lug bolt.

Other objects and advantages of this invention will become apparent from the description to follow when read in conjunction with the accompanying drawing.

BRIEF SUMMARY OF THE INVENTION

In carrying out this invention, I provide a sensor body which may be threaded directly onto an existing lug bolt on an automotive wheel. An axial passage is first drilled through the lug bolt and a sensing rod which is slidably carried on the body extends completely through the lug bolt. The sensing rod is normally held in a relatively retracted position by a pressure responsive member, preferably in the form of a toroidal tube pressure vessel, the interior of which is in direct communication with the interior of the tire mounted on the wheel. Both the tire and the toroidal tube are inflated to the same pressure through a common, conventional air filler valve and the toroidal tube under pressure snugly embraces the sensing rod to hold it against axial movement. The sensing rod is biased toward an extended or overcome position by means of a spring, the force of which may be adjusted. Hence, when pressure in the tire falls below a predetermined set level, the spring overcomes the pressure responsive member and extends the sensing rod to a position wherein it may activate an alarm circuit. In the preferred embodiment, the alarm circuit includes an electrified brush which is normally positioned in the rotational path of the sensing rod to be contacted thereby only when it is in its extended position. A single instantaneous contact of the brush is sufficient to overload the circuit and open a circuit breaker which, in turn, is adapted to close a second circuit including a warning light.

BRIEF DESCRIPTION OF THE DRAWING

In the drawing:

FIG. 1 is a partial vertical section view of an automotive truck wheel carrying a tire pressure alarm system embodying features of this invention;

FIG. 2 is a circuit diagram of the warning light circuit; and

FIG. 3 is a partial section view of a second embodiment of this invention.

DESCRIPTION OF A PREFERRED EMBODIMENT

The Embodiment of FIG. 1

Referring now to FIG. 1, the tire alarm system 10 of this invention includes a pressure sensor body 12 which is threaded into a tapped hole 14 in the end of a standard outer lug bolt 16, which in turn, is threaded onto the inner lug bolt 18. As is conventional the outer lug bolt 16 holds the inner wheel 20 on the drum 21, and the nut 22 holds the outer wheel 23 in place. A pressure sensor 10 is required for each tire 24 on the wheel and, hence, for the double wheel shown, two lug bolts 16, 18 will be so equipped. The double lug bolt 16, 18 is drilled axially at 25 to slidably receive a pressure sensing rod 26 which extends from a pressure chamber 28 in the sensor body 12, through a slide bearing sleeve 30.

Carried in the pressure chamber 28 is a toroidal tube flexible pressure vessel 32 with an integral filling duct 34 which is sealed within a fill pipe 36 on the end of which is fitted an air valve 38 of the type conventionally found on automotive wheels.

The toroidal tube 32 snugly embraces the sensing rod 26 and, under pressure, engages a head portion 40 carried thereon whereby air pressure in the tube will bias the rod 26 to the right in FIG. 1 against a spring 42, the force of which is adjusted by means of a threaded cap 44.

A branch conduit 46 is coupled at 47 to the filler pipe 36 to open through the existing air intake 23a on the wheel 23 and, hence, into the interior of a tire 24 carried thereon. Accordingly, when an air hose is placed on the valve 38, the tire 24 and the toroidal biasing tube 32 are inflated to the same pressure and are maintained in communication by the branch line 46. When the pressure in the tire 24 falls below the level determined by the setting of the spring 43, the toroidal biasing tube 32 will be overcome by the spring, allowing it to push the sensing rod 26 to the left as shown by the dotted lines in FIG. 1.

Mounted on some suitable part of the vehicle, as for example, the axle housing 48 is a detector brush 50 which may be mounted in a bracket 52 from which it is insulated at 54. An energizer conductor 56 connects the brush through a circuit breaker 58 (FIG. 2), which when opened is operative to close a circuit from the battery 60 to a signal light in the driver's compartment (not shown).

The detector brush extends past the brake shoe 64 and is disposed so as to be contacted by the sensing rod 26 when it is in its extended or overcome position indicated by the dotted lines. An instantaneous contact of sensing rod 26 and detector brush 50 during rotation of the wheel is sufficient to overload the circuit and open the circuit breaker causing the signal light 62 to be illuminated.

In order to change a wheel 22, it is merely necessary to disconnect the coupling 47 and remove the sensor housing 12 from the lug bolt 16. After the sensing device for the other tire 20 is similarly removed, the lug nuts and the wheel are removed in usual fashion.

THE EMBODIMENT OF FIG. 3

Referring now to FIG. 3, there is shown a second embodiment wherein the sensing rod 26a extends into a pressure chamber 28a in a sensor body 12a and through an annular diaphragm 66 which is sealed between the bearing sleeve 30a and an annular member 68 threaded into the head of the pressure chamber body 28a. Suitable means, such as an O-ring 70, seals between the bearing sleeve 30a and the body itself. Again, as in the embodiment of FIG. 1, pressure from the port 34a will force the diaphragm 66 to the right in FIG. 1 engaging the cap portion 40a on the sensing rod 26a and securing it against the force of adjustable spring 42.

While this invention has been described in conjunction with preferred embodiments thereof, it is obvious that modifications and changes therein may be made by those skilled in the art without departing from the spirit and scope of this invention.

What is claimed as invention is:

1. A tire pressure alarm system comprising
   a standard dual wheel lug bolt on a vehicle wheel modified by the provision of a tapped hole in the end thereof;
   a body threaded into said tapped hole;
   means forming a guide passageway in said body and through said lug bolt;
   a sensing rod of electrically conductive material slidably mounted in said guide passageway for longitudinal reciprocation in one direction and in the opposite direction thereto;
   one end of said rod protruding in said one direction through said lug bolt on the inside of the vehicle wheel;
   a flange cap member on the other end of said rod;
   means biasing said rod in said one direction;
   annular pressure responsive means sealed in said body to form an inflatable chamber, embracing said sensing rod and engaging said cap member to urge said rod in said opposite direction;
   a fill pipe for exposing said inflatable chamber to a source of gas pressure;
   duct means connecting said fill pipe to the interior of a tire on said vehicle wheel; and
   signal means for indicating when said pressure responsive means is overcome by said biasing means, including:
   an energized electrical sensing circuit with a contact brush therein;
   said brush being positioned at a point in the path of rotation of said one end of said sensing rod to be engaged thereby only when said sensing rod is in its overcome position;
   said sensing circuit being conditioned to be overloaded when said sensing rod contacts said brush;
   an electrical signal circuit;
   a signal device in said signal circuit; and
   a switch device operative to open said sensing circuit and close said signal circuit when said sensing circuit is overloaded.

2. The tire pressure alarm system defined by claim 1 wherein said pressure responsive members comprises:
   a toroidal tube embracing said sensing rod and engaging said cap member; and
   a fill pipe integral with said toroidal tube and sealed in said fill pipe.

3. The tire pressure alarm system defined by claim 1 wherein said pressure responsive member comprises:
   an annular chamber in said body; and
   a diaphragm sealed across said chamber and engaging around said sensing rod against said cap member;
   said fill pipe opening into said chamber.

4. The tire pressure alarm system defined by claim 1 including:
   adjustable means for setting the force of said biasing means.

* * * * *